though capable of producing saisfactory products, has many undesirable limitations. Primarily, in order to achieve optimum results with such a system, the expandable beads containing the blowing agent must be used fairly promptly in order to avoid loss of blowing agent, which has a normal tendency to exude and escape from the polymeric beads prior to extrusion or molding. This may be partially overcome by providing special protective liners in the containers for storage of the expandable bead material, however, other disadvantages common to this type of foam extrusion system remain such as the large inventory of various types and grades of expandable beads which must be maintained for ordinary commercial manufacturing operations.

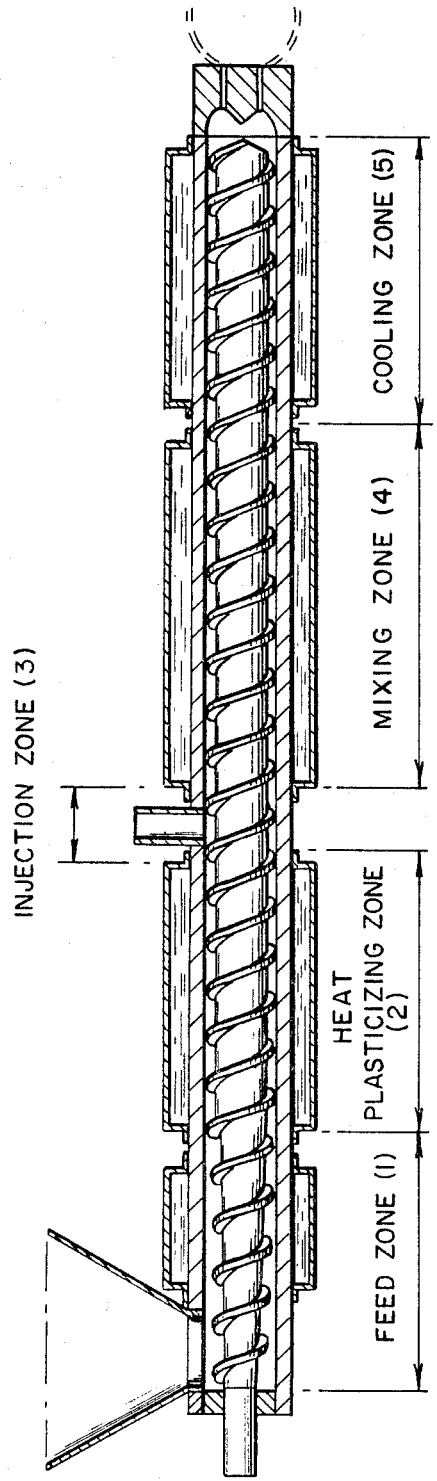

United States Patent Office 3,444,283
Patented May 13, 1969

3,444,283
METHOD FOR DIRECT INJECTION EXTRUSION OF POLYSTYRENE FOAM
Frank A. Carlson, Jr., Pittsford, N.Y., assignor to Mobil Oil Corporation, a corporation of New York
Filed Nov. 8, 1965, Ser. No. 506,836
Int. Cl. B29d 7/02; B29h 7/20
U.S. Cl. 264—53                    8 Claims

ABSTRACT OF THE DISCLOSURE

A method for the direct injection extrusion of polystyrene foam comprising forming a mixture of a polystyrene resin with a salt capable of liberating carbon dioxide and an organic acid mixture comprising an organic acid hydrate and an anhydrous acid; melting such an admixture in a screw-type extrusion apparatus and thereafter injecting and admixing with said molten mixture a liquid blowing agent into the molten mixture; and subsequently cooling the molten mixture and extruding the mixture as a polystyrene foam.

---

The present invention relates to a process for the production of foamed polymer materials.

In the prior art, foamed polymeric materials have been produced utilizing a variety of techniques. One common method comprises integrating with the polymeric material which is in the form of beads or pellets, a normally liquid or gaseous blowing agent, such as pentane for example, and subsequently utilizing such expandable beads or pellets to form the desired foamed product by extrusion, cavity molding or any desired molding process. This method, al A more advantageous prior art extrusion system for the formation of foamed or cellular polymeric material is what is commonly referred to as a direct injection extrusion operation wherein the blowing agent is injected directly into a molten mass of foamable polymeric material and the desired foam material is extruded, as a sheet or tube for example, in a single continuous operation.

The process of the present invention relates to an improvement in the latter method referred to above, i.e., the direct injection extrusion process. Although the direct injection system offers advantages over a system which is dependent upon expandable beads for its operation, both systems are largely dependent for successful operation upon the selection of a proper cell size control additive to insure proper cell size of the final products The cell size control additive is in turn dependent to some extent upon the type of foamed polymer to be extruded It has been found that, in the direct injection extrusion system, when polystyrene foam is being produced, in order to achieve the desired uniformly fine cell size in the final polystyrene foam product, a particular combination of cell size control additives is necessary. In particular, in the extrusion of polystyrene foam materials, it has been found that cell size control additives may be admixed with the polystyrene resin prior to extrusion thereof in order to control the size of the individual cells formed in the polystyrene, which cells result from the escape of the volatile blowing agent from the molten polystyrene when it is extruded. In accord with the process of the present invention, it has been found that through the employment of a certain combination of cell size control additives, a foam material may be produced which is desirably characterized by control to an extremely fine cell structure, and, for example, to cell sizes having diameters on the order of less than about .025 inch.

Prior art methods for controlling cell size in foam extrusion have calleed for the employment of a variety of additives to achieve the desired cell size. The close control of cell size in the final foam product is important in achieving the desired physical characteristics necessary for particular end use applications of the foam product. For example, when the foam is to be employed in packaging applications, e.g. for the manufacture of molded trays or other types of containers, it is desirable that the foam be resilient and flexible enough to withstand manual flexure of the containers normally encountered in the handling of such products. In such applications, if a container is fabricated from a foam material having a relatively coarse cell structure (i.e., cell diameters on the order of over about 0.025 inch), it is brittle and hence unsuitable for particular container end use applications. On the other hand, containers fabricated from foam materials having a very fine cell structure (e.g., cell diameters on the order of less than about 0.025 inch) are ideally suited for use as packaging trays and the like as a result of such fine cell structure.

In the past, various additives have been employed in direct injection foam extrusion processes to achieve cell size control. Examples of materials which have been employed to perform this function are finely-divided calcium silicate and certain other salts, as disclosed in United States Patent No. 2,911,382. United States Patent No. 3,151,192 discloses the employment of mixtures of sodium bicarbonate with organic acids, such as citric, for example, to control the foam cell size. Since a certain amount of additive material remains present in the final foam product, this latter combination of additive materials is ideally suited for food container applications where care must be taken to insure that the materials of container construction are completely non-toxic. It has been found, however, that the employment of cell size control additive mixtures such as an organic acid and a carbonate or bicarbonate salt in direct injection foam extrusion do not result in the formation of foam materials having the desirable fine cell structure as described above. For example, attempts to employ mixtures of either citric acid hydrate and sodium bicarbonate or mixtures of anhydrous citric acid and sodium bicarbonate in direct injection foam extrusion operations resulted in a foam product characterized as being quite brittle as a result of the coarse cell structure of the foam produced. In other words, the respective common forms of the organic acid (i.e. either in its hydrated form or anhydrous form) when admixed in varying proportions with a carbonate or bicarbonate salt and employed as a cell size control additive, failed to give adequate control in that in general only a coarse, undesirably large cell size, product resulted.

The drawing is a diagrammatic side elevation view, in cross section, of an extrusion apparatus which may be employed to practice the direct injection extrusion method of the present invention.

In accord with the process of the present invention, it has been found that desirably fine cell size, e.g. on the order of less than about 0.025 inch may be produced, utilizing standard foam extrusion techniques, by the employment of a certain combination or mixture of cell size control additive material. For purposes of the present invention, the cell size control additive system may be considered as including a two component system comprising a carbon dioxide liberating salt component and an acid component as described hereinafter. The salt component may be any salt capable of reaction with an organic acid under standard extrusion conditions to liberate carbon dioxide. Typical examples of such salts include alkali and alkaline earth carbonates and bicarbonates of sodium, potassium, calcium, lithium, strontium, and barium. Of such salts, sodium bicarbonate is a preferred embodiment which gives excellent results in the practice of the present invention.

The acid component of the cell size control additive system is characterized in comprising a mixture of at least two acids, one of said acids being present in its hydrated form and the other acid being present in its anhydrous form. The two member acid component may consist of the same acid, i.e. an organic acid which exists in both the hydrate and anhydrous form, or two different organic acids, as long as one of the acids present is a hydrate and the other is in anhydrous form. Typical examples of organic acids which may be employed in the acid component of the cell size control additive system of the present invention include oxalic, citric, succinic, itaconic, malonic, citraconic, adipic, malic, tartatic, phthalic, chloroacetic, diglycollic and others. In particular citric acid has given excellent results in accord with the process of the present invention and in instances where the foam product is intended for use in food packaging operation, its low toxicity makes this an ideally suitable acid.

It has been found that a uniformly fine cell size in the final product may be obtained with use of the acid components of the cell size control additive in ratios of anhydrous acid to acid hydrate which may vary within rather wide ranges. For example, the percent by weight ratio of hydrate to anhydrous form may vary from about 10:90 to about 90:10. However, in the extrusion of polystyrene foam, and considering the time-temperature conditions which the acid components of the system are exposed to under normal commercial extrusion conditions, it has been found desirable to employ at least an excess, though even very slight, of the anhydrous acid. The amount of carbonate or bicarbonate salt employed in the cell size control additive system of the present invention may also vary within wide limits. However, it has been found desirable for practical purposes to employ an excess of salt with respect to the acid components to maintain non-acidic conditions within the extruder thereby reducing the likelihood of acid corrosion of the extrusion equipment.

The total amount of cell size control additive mixture, i.e., the total weight percent of salt, acid hydrate and anhydrous acid based upon the total weight of polystyrene resin, which is employed in the present invention is generally less than about 5% and preferably from about 3% to about 0.1% by weight. Although a total concentration of the additive mixture higher than the aforesaid may be used, the aforesaid amounts are generally suitable.

The method of the present invention may be carried out using conventional foam extrusion equipment such as, for example, apparatus similar to that disclosed in U.S. Patent No. 3,151,192. In such a foam extrusion system, the polymer is fed into the extruder from a hopper and the screw of the extruder propels it into the main portion of the extruder barrel which may be jacketed for the introduction of temperature control fluids. In the extruder, the plastic is compacted and heated until melted, and a blowing agent, such as liquid pentane for example, is injected or pumped into the melted polymer through a suitable inlet. A wide variety of materials may be employed in the present invention as blowing agents. For example, volatile organic liquids, such as butane, propane, hexane and petroleum ether are also highly suitable for use with polystyrene in the foam extrusion thereof. Cooling fluid circulated in the barrel jacket around the terminal portion of the extruder then lowers the temperature of the foamable polymer melt to the requisite extrusion temperature. A forming die is affixed to the end of the extruder and the final foam product may be formed by extrusion through said forming die either in the form of flat sheets or a tube which may be slit to form one or more sheets.

In the practice of the present invention, it has been found convenient to add the cell size control additive system of the present invention to the polymer resin, which is in the form of beads or pellets, prior to the introduction of said resin into the hopper which leads to the feed zone of the extruder. This may be accomplished by admixing certain quantities of the cell size control mixture as described above, i.e. acid hydrate, anhydrous acid, and carbonate or bicarbonate salt, with the polymer resin particles in a drum tumbler, ribbon blender, or other suitable dry mixing apparatus. After the resin particles have been coated with the cell size control mixture, the material is then fed to the hopper of the extruder. For purposes of the present description and for a clearer understanding thereof, the extruder may be considered as comprising five distinct zones. In the first zone, hereinafter called the feed zone, the polymer charge admixed with the cell size control additive is introduced into the extruder and is carried forward by the forwarding action of the extruder screw to the second or heat plasticizing zone of the extruder. In this zone, as a result of an increase in root diameter of the forwarding screw, the polymer is compacted. Simultaneously, heated fluids, which are circulated through the temperature control jacket which surrounds the outside surface of the extruder barrel, raise the temperature of the polymer material to effect thorough melting thereof. Next, the now molten polymer is forwarded to the third zone of the extruder, hereinafter referred to as the injection zone, wherein the blowing agent is introduced into the extruder utilizing suitable means such as an injection valve. The requisite pressure to achieve introduction of the blowing agent into the molten polymer mass within the injection zone of the extruder need only be sufficiently high to overcome the pressure of the molten polymer at the point of injection into the extruder. The root diameter in the injection zone of the extruder may be either identical to the root diameter of that portion of the screw in the preceding plasticizing zone or may be somewhat less than that of the root diameter of the screw in the plasticizing zone depending upon the type of extrusion equipment employed. Also, rather than injecting pentane at a single point in the injection zone, pentane may be injected at a plurality of points within the zone. Following the injection zone, the mixture of molten polymer and liquid pentane is advanced by the rotation of the forwarding screw to the fourth zone of the extruder hereinafter referred to as the mixing zone. In the mixing zone, the liquid pentane-molten polymer mixture is thoroughly admixed while being forwarded through the extruder to the fifth zone. In the fifth zone of the extruder, hereinafter referred to as the cooling zone, the forwarding screw is characterized as having a constant pitch and constant flight diameter. The extruder barrel throughout the cooling zone of the extruder is cooled by circulation of suitable cooling fluids through the temperature control jacket surrounding this portion of the extruder barrel. The cooling zone of the extruder functions to reduce the temperature of the molten polymer liquid pentane mixture to a temperature at which the material within the extruder may be extruded in the form of a suitable foam structure. This is accomplished by passing the extruder charge material at the requisite temperature through a suitable die affixed to the extruder at the end of the cooling zone thereof.

The following are some specific examples of the process of the present invention. These are given by way of illustration only and are not in any way intended as limitative of the scope of the invention.

EXAMPLE 1

Polystyrene pellets of approximately 1/16 in. diameter (supplied by the Foster Grant Co., and identified as F.G.-50S) were admixed in a drum-tumbler with sodium bicarbonate, citric acid hydrate, and anhydrous citric acid to provide a thorough mix comprising 0.50% sodium bicarbonate, 0.06% citric acid hydrate, and 0.32% anhydrous citric acid, by weight of the polystyrene resin. The mixture of polystyrene pellets and cell size control additive mixture was discharged into the feed hopper of a screw extruder of the system as aforediscussed. The charge progressed from the feed zone of the extruder to the heat plasticizing zone which was maintained at a temperature of from about 400 to about 450° F. The resulting molten mass was then progressed by the continuous rotation of the forwarding screw to the injection zone where approximately 5% by weight (based on the total weight of polystyrene) of liquid pentane was pumped into the molten resin at a pressure of approximately 2,000 pounds per square inch, with the temperature in the injection zone maintained at approximately 400 to 450° F. The pentane-molten polymer mixture was then forwarded to the mixing zone of the extruder, which was maintained at a temperature of approximately 400 to 450° F., wherein the liquid pentane and molten polystyrene were thoroughly mixed. The molten mixture was subsequently forwarded to the cooling zone of the extruder where, by circulation of cooling fluids through the temperature control jacket surrounding the surface of this portion of the extruder, the temperature of the molten mixture was reduced from about 400–450° F. to a temperature of about 250–265° F. at the terminal portion of the cooling zone of the extruder. Finally, the molten mixture was extruded through a tubular die affixed to the terminal end of the extruder adjacent the cooling zone thereof, whereupon a tube of foam polystyrene was formed. This tube was slit into a sheet of foamed material characterized in having a density of approximately four pounds per cubic foot and an average cell diameter of about 0.005 inch. The material was flexible and ideally suited for packaging container applications.

EXAMPLE 2

The procedure of Example 1 was followed but with a mixture of cell size control additive as follows (i.e., use of an increased amount of citric acid hydrate in the acid component) 0.5% by weight sodium bicarbonate, 0.18% by weight citric acid hydrate, and 0.32% by weight anhydrous citric acid.

The foam material which was produced when the above cell size control additive mixture was employed was characterized in having a density of approximately 4 pounds per cubic foot and an average cell diameter of approximately from about 0.003 to about 0.002 inch. The material was flexible and ideally suited for packaging container applications.

EXAMPLE 3

The procedure of Example 1 was followed but with use of a mixture of cell size control additive as follows (i.e., use of anhydrous citric acid alone as the acid component) 0.5% by weight sodium bicarbonate, and 0.40% by weight anhydrous citric acid, based on the weight of the polystyrene.

The foam material which was produced when the above cell size control additive mixture was employed was characterized in having a coarse cell structure with an average cell diameter of over about 0.025 inch. As compared to the material produced in accord with Examples 1 and 2 wherein both citric acid hydrate and anhydrous citric acid was employed in the cell size control mixture, the present material was extremely brittle.

EXAMPLE 4

The procedure of Example 1 was followed but with a mixture of cell size control additive as follows (i.e., use of citric acid hydrate alone as the acid component) 0.5% sodium bicarbonate, and 0.40% citric acid hydrate, based on the weight of the polystyrene.

The foam material which was produced when the above cell size control additive mixture was employed was characterized in having a coarse cell structure with an average cell diameter of over about 0.025 inch. As compared to the material produced in accord with Examples 1 and 2 wherein both citric acid hydrate and anhydrous citric acid was employed in the cell size control mixture, the present material was extremely brittle.

What is claimed is:

1. A direct injection process for the extrusion of polystyrene foam which comprises
    (a) forming an admixture comprising a polystyrene resin, a salt capable of liberating carbon dioxide, and and organic acid mixture comprising an organic acid hydrate and an anhydrous organic acid;
    (b) heating said admixture to a temperature sufficient to melt the admixture;
    (c) injecting a liquid blowing agent into the resulting said molten mixture;
    (d) mixing said liquid blowing agent with said molten mixture;
    (e) cooling said melted mixture to a temperature at which it is extrudable as a polystyrene foam; and extruding said melted mixture as a polystyrene foam.

2. The process in accordance with claim 1 wherein said organic acid mixture comprises a percent by weight ratio of organic acid hydrate to anhydrous organic acid of about 10:90 to about 90:10.

3. The process in accordance with claim 1 wherein said organic acid mixture comprises an organic acid hydrate and an anhydrous organic acid wherein said anhydrous organic acid is present in an amount of over 50% by weight based upon the weight of said acid mixture.

4. The process in accordance with claim 1 wherein said organic acid hydrate is citric acid hydrate and where said anhydrous organic acid is anhydrous citric acid.

5. The process in accordance with claim 1 wherein said salt is sodium bicarbonate.

6. The process in accordance with claim 4 wherein the said salt is sodium bicarbonate.

7. The process in accordance with claim 2 wherein said anhydrous organic acid is present in an amount of over 50% by weight based upon the weight of said acid mixture.

8. The process in accordance with claim 1 wherein said salt is sodium bicarbonate, said organic acid mixture comprises citric acid hydrate and anhydrous citric acid, said organic acid mixture being further characterized as comprising a percent by weight ratio of citric acid hydrate to anhydrous citric acid of from about 10:90 to about 90:10, and said blowing agent is liquid pentane.

(References on following page)

References Cited

UNITED STATES PATENTS

| | | | |
|---|---|---|---|
| 3,151,192 | 9/1964 | Jacobs et al. | 264—53 |
| 3,160,688 | 12/1964 | Aykanian et al. | 264—53 |
| 2,911,382 | 11/1959 | Barkhuff et al. | 260—2.5 |
| 2,941,965 | 6/1960 | Ingram | 260—2.5 |
| 3,069,367 | 12/1962 | Beaulieu et al. | 260—2.5 |
| 3,089,857 | 5/1963 | Pottenger | 264—53 XR |

FOREIGN PATENTS 854,586  11/1960  Great Britain.

OTHER REFERENCES

Goldsberry, H. H.: "Blow Molding Expandable Polystyrene," in SPE Journal, April 1962, pp. 448–454. Copy in 264-53.

Davies, D. N.: "The Extrusion, Fabrication and Application of Thin Expanded Polystyrene Sheet," in British Plastics, August 1963, pp. 452–457. Copy in 264-53.

PHILIP E. ANDERSON, *Primary Examiner.*

U.S. Cl. X.R.

18—12; 260—2.5; 264—54, 176